US008045954B2

(12) United States Patent
Barbeau et al.

(10) Patent No.: US 8,045,954 B2
(45) Date of Patent: Oct. 25, 2011

(54) WIRELESS EMERGENCY-REPORTING SYSTEM

(75) Inventors: Sean J. Barbeau, Tampa, FL (US);
Philip L. Winters, Tampa, FL (US);
Rafael Perez, Temple Terrace, FL (US);
Miguel Labrador, Tampa, FL (US);
Nevine Georggi, Valrico, FL (US)

(73) Assignee: University of South Florida, Tampa, FL (US)

( * ) Notice: Subject to any disclaimer, the term of this patent is extended or adjusted under 35 U.S.C. 154(b) by 587 days.

(21) Appl. No.: 11/465,931

(22) Filed: Aug. 21, 2006

(65) Prior Publication Data
US 2007/0040895 A1    Feb. 22, 2007

Related U.S. Application Data

(60) Provisional application No. 60/595,960, filed on Aug. 19, 2005.

(51) Int. Cl.
*H04M 11/04* (2006.01)
*H04W 24/00* (2009.01)
*H04W 4/00* (2009.01)
*G08G 1/123* (2006.01)
*G01C 21/00* (2006.01)
*G01C 21/30* (2006.01)
*G01C 21/32* (2006.01)

(52) U.S. Cl. ............... 455/404.1; 455/404.2; 455/456.1; 455/457; 455/466; 340/995.1; 340/995.15; 701/207; 701/208; 701/212

(58) Field of Classification Search ............... 455/404.1, 455/404.2, 414.2, 414.3, 456.1, 466, 457, 455/456.3; 340/995.1, 995.15; 701/117, 701/207, 208, 212
See application file for complete search history.

(56) References Cited

U.S. PATENT DOCUMENTS

| | | | |
|---|---|---|---|
| 5,742,233 A * | 4/1998 | Hoffman et al. | 340/573.1 |
| 5,922,040 A * | 7/1999 | Prabhakaran | 701/117 |
| 6,397,054 B1 * | 5/2002 | Hoirup et al. | 455/404.1 |
| 7,184,744 B1 * | 2/2007 | Schnabel | 455/404.2 |
| 7,409,202 B2 * | 8/2008 | McClendon | 455/404.1 |
| 7,433,672 B2 * | 10/2008 | Wood | 455/404.1 |
| 2001/0022615 A1 * | 9/2001 | Fernandez et al. | 348/143 |
| 2002/0005804 A1 * | 1/2002 | Suprunov | 342/457 |
| 2003/0162557 A1 * | 8/2003 | Shida | 455/521 |
| 2004/0176123 A1 * | 9/2004 | Chin et al. | 455/521 |
| 2004/0203923 A1 * | 10/2004 | Mullen | 455/456.1 |
| 2005/0111630 A1 * | 5/2005 | Potorny et al. | 379/45 |
| 2006/0168185 A1 | 7/2006 | McCall et al. | |
| 2006/0217105 A1 * | 9/2006 | Kumar et al. | 455/404.1 |
| 2006/0270421 A1 * | 11/2006 | Phillips et al. | 455/457 |
| 2007/0041368 A1 * | 2/2007 | Lorello | 370/352 |

OTHER PUBLICATIONS

Marion County, FL job description for E-911 Systems Specialist (last revised Jun. 2003).*
Berryman, Marc, GeoSpatial Technology in Public Safety: What's Next? ESRI 2003 User Conference (http://proceedings.esri.com/library/userconf/proc03/abstracts/a0619.pdf).*

* cited by examiner

*Primary Examiner* — Dwayne Bost
*Assistant Examiner* — Larry Sternbane
(74) *Attorney, Agent, or Firm* — Courtney M. Dunn; Smith & Hopen, P.A.

(57) ABSTRACT

A method of providing emergency related information to and from a centralized location over a wireless network. The method utilizes cellular phones in emergency communications and entails two embodiments that employ location-aware technologies, in portable form, in security applications. One embodiment serves as a modern high-tech "neighborhood watch," enabling law enforcement access to the many "eyes and ears" of the public simultaneously via available cell phones. Cell phones with embedded digital cameras allow the instant capture and remote submission of suspicious circumstances to law enforcement through pictures or video.

20 Claims, 9 Drawing Sheets

WIRELESS EMERGENCY-REPORTING SYSTEM

CROSS REFERENCE TO RELATED APPLICATIONS

This application claims priority to currently pending U.S. Provisional Patent Application 60/595,960, filed Aug. 19, 2005.

FIELD OF INVENTION

This invention relates to a method of providing emergency related information to and from a centralized location over a wireless network.

SUMMARY OF INVENTION

The present invention improves transportation security by leveraging the use of personal electronic devices with global positioning system (GPS) in security applications. Applying low cost, scalable, technologies that are widely-used by the public to augment and boost intelligence gathering, analysis and sharing is a cost-effective way to fill gaps in emergency communications. For example, a camera cell phone with GPS capabilities could be used to take a snapshot and report locations of suspicious objects or missing persons.

The inventive system utilizes cellular phones in emergency communications and describes two embodiments that employ location-aware technologies, in portable form, in security applications. One embodiment serves as a modern high-tech "neighborhood watch," enabling law enforcement access to the many "eyes and ears" of the public simultaneously via available cell phones. Cell phones with embedded digital cameras allow the instant capture and remote submission of suspicious circumstances to law enforcement through pictures or video. Not only does this give the responders a visual representation of the situation but also information such as time, date, voice recordings, and physical location of the submitted occurrence. Using these data inputs, the system intelligently filters, classifies, and displays simultaneous submissions from various locations onto a computer screen so the dispatcher can manage the incident more efficiently. The system also allows the dispatcher to handle many more submissions simultaneously while identifying trends and patterns that may not be immediately obvious to a responder in the field.

Once the dispatcher views a particular message, they have many options of what they can do to respond to that message. In an alternate embodiment, three links appear at the bottom of the information window for each message: "Email," "Call," and "Forward." By clicking "Email," the dispatcher can send a written message back to the cell phone, complete with multimedia attachments as seen in figure. This feature could be used to give recorded audio instructions to a participant or a photo of a missing child or suspect. Another aspect is the "reverse-911" component for data-enabled mobile phones.

Upon the identification of a threat and the issuance of the appropriate warning, the dispatcher can instantly relay a message to participants with cell phones in a certain geographic area. The real-time control of the when, where, and to whom such information is instantly disseminated is of great interest to law enforcement and public safety officials.

In yet another embodiment, the system disperses public announcements such as evacuation warnings, evacuation routes, evacuation zones, current shelter locations, re-entry time, etc. The application can send evacuation zone information and messages to cell phones users based on their current location. Multi-media messaging could be delivered in users' own languages simultaneously while reaching more people in less time.

The architecture described herein seamlessly connects the various standardized components and Application Programmer Interfaces (API) together to support these real-time services. The use of commercially available hardware and software components keeps implementation and operation of such a system at an extremely low cost compared to the cost of creating and maintaining an entirely proprietary solution. The existing private infrastructure of mobile phone networks and privately owned mobile phones provides a method of reaching the public without the need for purchasing additional equipment or maintaining an IT department to support the network.

Additionally, freely available location APIs eliminate the need to recreate low-level components and allow focus on high-level priorities. The issues of scalability, compatibility, and interoperability are central to the design of this architecture. When possible, standardized components are used in order to provide flexible solutions. Components are also designed in a modular fashion to allow the creation of application-specific functions without needing to redesign the entire system.

System architecture supports two-way multimedia communication that can be based on personal profiles, including an individual's real-time location. This feature allows unique services that have not been previously possible, including the automatic submission of pictures and video captured by mobile phones that are automatically plotted on a webpage map for anyone with a web browser to see. Additionally, the webpage user can then send information back to the mobile phones based on the location from where the picture or video originated. This mass messaging has the potential to be specifically targeted at certain geographic areas, or the person can use voice-Over-IP calling service to initial a phone call by clicking a limited number of multiple mobile phone numbers on the map. The common platform of the web browser can be used to share real-time information between groups in distributed locations, as anyone with a PC or laptop with an internet connection can log into the page.

Massive information gathering and dissemination tasks can be efficiently and easily accomplished through this architecture. This information is also sent using the Internet and mobile phone data channels, which are not as susceptible to overcrowding as traditional phone line networks. Therefore, the communication ability of this system is not likely to be affected by disasters of national significance and frees voice lines in emergencies for first responders and other officials. In situations of mass residential power failures, as is often the situation in the aftermath of hurricanes, mobile phones can be powered by hand or car chargers. In such a situation, much of the public may not have access to television or even radio, but could receive updates via a mobile phone.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
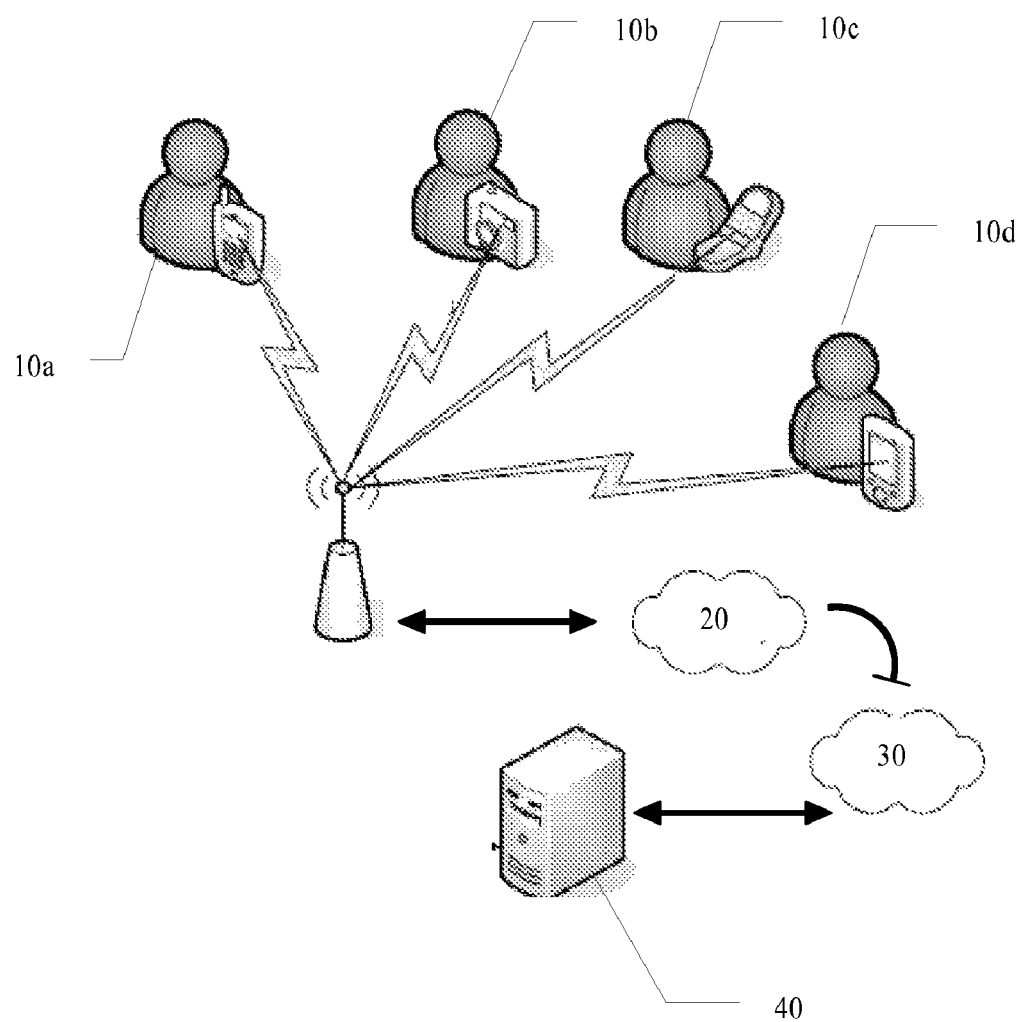
FIG. 1 is a high-level block diagram of the inventive system.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention improves transportation security by leveraging the use of personal electronic devices with global positioning system (GPS) in security applications. Applying low cost, scalable, technologies that are widely-used by the public to augment and boost intelligence gathering, analysis and sharing is a cost-effective way to fill gaps in emergency communications. For example, a camera cell phone with GPS capabilities could be used to take a snapshot and report locations of suspicious objects or missing persons.

The inventive system utilizes wireless phones in emergency communications and describes two embodiments that employ location-aware technologies, in portable form, in security applications. One embodiment serves as a modern high-tech "neighborhood watch," enabling law enforcement access to the many "eyes and ears" of the public simultaneously via available cell phones. Cell phones with embedded digital cameras allow the instant capture and remote submission of suspicious circumstances to law enforcement through pictures or video. Not only does this give the responders a visual representation of the situation but also information such as time, date, voice recordings, and physical location of the submitted occurrence. Using these data inputs, the system intelligently filters, classifies, and displays simultaneous submissions from various locations onto a computer screen so the dispatcher can manage the incident more efficiently. The system also allows the dispatcher to handle many more submissions simultaneously while identifying trends and patterns that may not be immediately obvious to a responder in the field.

Once the dispatcher views a particular message, they have many options of what they can do to respond to that message. In this embodiment, three links appear at the bottom of the information window for each message: "Email," "Call," and "Forward." By clicking "Email," the dispatcher can send a written message back to the cell phone, complete with multimedia attachments. This feature can be used to give recorded audio instructions to a participant or a photo of a missing child or suspect.

Another aspect of this system is the "reverse-911" component for data-enabled mobile phones. Upon the identification of a threat and the issuance of the appropriate warning, the dispatcher can instantly relay a message to participants with cell phones in a certain geographic area. The real-time control of the when, where, and to whom such information is instantly disseminated is of great interest to law enforcement and public safety officials.

Another embodiment disperses public announcements such as evacuation warnings, evacuation routes, evacuation zones, current shelter locations, re-entry time, etc. The system sends evacuation zone information and messages to cell phones users based on their current location. Multi-media messages are delivered in the users' own languages.

Wireless telecommunications and location determination capabilities of mobile phones allows the use of two-way, multimedia, location-based, scalable, and personalized applications. The architecture described herein seamlessly connects various standardized components and Application Programmer Interfaces (API) together to support real-time services. The use of commercial hardware and software components keeps implementation and operation the system at a low cost compared to the cost of creating and maintaining an entirely proprietary solution. The existing private infrastructure of mobile phone networks and privately owned mobile phones provides a method of reaching the public without the need for purchasing additional equipment or maintaining personnel to support the network.

Freely available location APIs eliminate the need to recreate low-level components and allow focus on high-level priorities. The issues of scalability, compatibility, and interoperability are central to the design of this architecture. When possible, standardized components are used in order to provide flexible solutions. Components are also designed in a modular fashion to allow the creation of application-specific functions without needing to redesign the entire system.

System architecture supports two-way multimedia communication on personal profiles, including an individual's real-time location. This feature allows unique services including the automatic submission of pictures and video captured by mobile phones that are then automatically plotted on a webpage map for anyone with a web browser to see. Additionally, the webpage user can then send information back to the mobile phones based on the location from where the picture or video originated. This mass messaging has the potential to be specifically targeted at certain geographic areas, or the person can use a voice-Over-IP system to initiate a phone call by clicking a number of mobile phone numbers on the map. The common platform of the web browser can be used to share real-time information between groups in distributed locations; as anyone with a PC or laptop with an internet connection can log into the page.

Massive information gathering and dissemination tasks are efficiently and easily accomplished through this architecture. Information is also sent using the Internet and mobile phone data channels, which are not as susceptible to overcrowding as traditional phone line networks. Therefore, the communication ability of this system is not as likely to be affected by disasters of national significance and frees voice lines in emergencies for first responders and other officials. In situations of mass residential power failures, as is often the situation in the aftermath of hurricanes, mobile phones can be powered by hand or car chargers. In such a situation, much of the public may not have access to television or even radio, but could receive updates via a mobile phone.

The inventive system utilizes wireless phones in emergency communications. Two illustrative embodiments employ location-aware technologies in portable form in security applications. First, the system serves as a modern hightech "neighborhood watch," enabling law enforcement access to the many "eyes and ears" of the public simultaneously via available cell phones. Cell phones with embedded digital cameras allow the instant capture and remote submission of suspicious circumstances to law enforcement through pictures or video. Not only does this give the responders a visual representation of the situation but also information such as time, date, voice recordings, and physical location of the submitted occurrence. Using these data, the WI-VIA system intelligently filters, classifies, and displays simultaneous submissions from various locations onto one visual, a computer screen, so the dispatcher can manage the incident more efficiently.

The system also allows the dispatcher to handle many more submissions simultaneously while identifying trends and patterns that may not be immediately obvious to a responder in the field. Another aspect is the "reverse-911" component for data-enabled mobile phones. Upon the identification of a threat and the issuance of the appropriate warning, the dispatcher can instantly relay a message to participants with cell phones in a certain geographic area. The real-time control of the when, where, and to whom such information is instantly disseminated is of great interest to law enforcement and public safety officials; for example, the need to evacuate a particular area due to hurricane/flood warnings.

Another embodiment disperses public announcements such as evacuation warnings, evacuation routes, evacuation zones, current shelter locations, re-entry time, etc. This embodiment can "push" evacuation zone information and messages to cell phone users based on their current location. Multi-media messaging could be delivered in users' own languages simultaneously while reaching more people in less time.

This system utilizes a wireless communication network backup that is interoperable among agencies in emergencies and can serve as an additional form of communications. From the perspective of the national plan for research and development (R&D), the U.S. Department of Homeland Security (DHS) identified priority inventions after being judged both strongly needed and achievable in a short timeframe. Some, such as the theme of advanced risk modeling and simulation, embody steps in what will be a continuing evolution of methods and technology that will move as fast as resources and knowledge allow. Among these steps: Provide real-time distributed data collection, visualization, and interpretation. Use pilot studies and test beds to begin to integrate network architectures consisting of sensors, controls, real-time data/information, and systems to have uniform structures and common languages, interoperability, compatibility, and scalability. Office of Science and Technology Policy, Executive Office of the President, "The National Plan for Research and Development in Support of Critical Infrastructure Protection," Science and Technology Directorate of DHS, 2004, p. 71.

From a state or county perspective, the importance of effective communication systems during emergencies is not limited to terrorist threats. Hurricane evacuation, re-entry, and recovery are different types of emergencies that government agencies and the public have to manage. For example, the Hillsborough County (Florida) Emergency Management Operations Center reported that, during Hurricane Charlie in 2004, the citizen advisory hotline received an average of 6,000 calls per hour from citizens inquiring about their specific evacuation zone. Providing the capability to target messages and track individuals easily and inexpensively saves precious minutes in an emergency. To enhance emergency management operations, vital information should be announced to the public quickly and efficiently, not only through the general Emergency Alert System (EAS) via TV and radio, but also to mobile devices, specifically targeted geographic areas, selected groups, etc.

The system gathers real-time GPS-distributed visual data and disseminates information to targeted participants in specific areas. The system interprets, in real-time, users in the actual evacuation zone where they are located. The architecture described herein uses available geographic APIs for a web interface (i.e. Google® maps) and cell phone (i.e. Location API), camera cell phones with GPS ability, and a server.

Overview of System Architecture

Two-way community-oriented, personalized applications were developed utilizing a two way location-based multimedia messaging architecture and infrastructure. FIG. 1 shows a high-level view of the system architecture developed under this invention that enables position-based multimedia messaging applications. The four main components of the system are client-side (end-user) devices 10a-10d, wireless communication network 20, Internet 30, and server-side (database and application) servers 40. FIG. 1 shows these four components and the GPS satellite system utilized by end-user devices with embedded GPS chips.

In FIG. 1, end-user devices 10a-10d, whether a wireless telephone or a PDA, comprise the client-side application 10 with software providing the user interface and obtaining user position information. The second component, wireless network 20, is utilized as a transit network since all users are assumed to have wireless service. Wireless network 20 can also provide user position information through location systems. The Internet 30, the third component, is used as a transport network to send the application data from wireless network 20 to serves implementing the service and vice versa. The final components are the servers (40) running the application for all users and containing the database(s) holding user and application data. Depending on the type of service provided by the application, access to different databases and servers may be needed. In addition, some services may need an "intelligent" application (i.e., expert system) running at the server-side in order to make decisions when conveying important and timely information to the user.

The system is designed to send messages either automatically or on demand. In the case of on-demand messages, the user will request the service only when needed using the application user interface. In the case of automatic messaging, the system must include some extra capabilities to determine if it is appropriate to send a message to the user. For example, the system can automatically determine in which evacuation zone an individual is located and automatically relays the proper message to them (i.e., "You are in Evacuation Zone B, which is currently under a mandatory evacuation order. Please evacuate immediately.") The system can also be adapted for many other uses (e.g., locations of hazardous material delivery routes or storage facilities).

Description of System Modules

This section describes the system architecture in more detail, as shown in FIGS. 2A through 2D, including the internal modules that comprise the four components function. Tables 1 through 4 show the representative elements of FIGS. 2A through 2D.

Client-Side Module

Figure 2A:
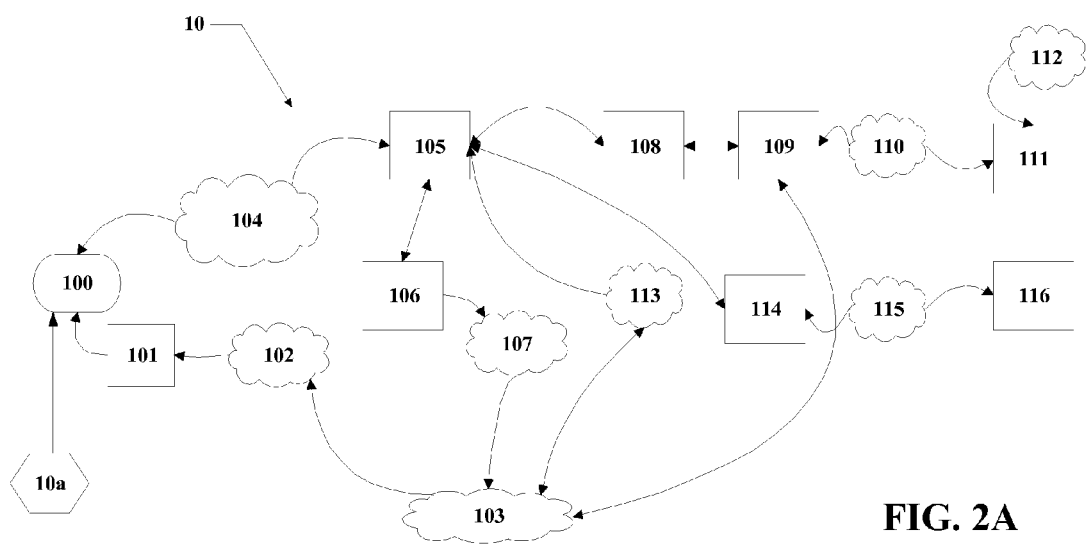
FIG. 2A is a block diagram illustrating the client module of the inventive system.

The client-side module of an illustrative embodiment, shown in FIG. 2A, uses the Java 2 Platform Micro Edition (J2ME). Java was used in the illustrative embodiment because it provides an environment that specifically addresses the needs of wireless telephones, PDAs, and embedded devices, i.e., devices with limited resources in terms of power, storage, and CPU cycles. J2ME introduces the concept of configurations and profiles that dynamically tailor and configure the runtime environment according to the capabilities of the end-user device.

Configurations classify devices according to their respective processing power and storage size; therefore, devices with similar resources are supported by the same configuration. Profiles, which sit on top of the configuration, offer particular features to meet the demands of specific applications and end-user devices. J2ME includes two configurations, the Connected Limited Device Configuration (CLDC) and the Connected Device Configuration (CDC). The CLDC provides a small virtual machine, the Kilobyte Virtual Machine (KVM), to focus on resource-constrained mobile devices such as pagers, wireless telephones, and small PDAs. The CDC includes a full Java 2 Virtual Machine used for more powerful devices such as larger PDAs or vehicle-based systems.

The Mobile Information Device Profile (MIDP) runs on top of the CLDC and provides a series of Application Programming Interfaces (APIs) for developing user interfaces. This modular approach establishes network connections such as HTTP, HTTPS, and regular TCP-UDP. The profiles can be extended with additional APIs to provide more functionality to the environment and automate several important tasks. For example, the J2ME Location API (109) provides a means to request and obtain GPS coordinates from the GPS hardware or wireless network, regardless of the hardware implementation of the positioning technology. The importance of this API is that the details about the positioning methods utilized by the API to provide the position information are completely hidden from the application developer.

Other APIs utilized in the client application are the J2ME Mobile Media API (114) for displaying audio, video and images, and the J2ME Wireless Messaging API (106) for transmitting information to the wireless network utilizing the Multimedia Messaging Service (MMS) and the Short Messaging Service (SMS). In this application, a Mobile Originating (MO) message (messages sent from cell phone to server) originates using the MMS service with the user position, provided by the Location API, packaged as part of the message payload. Mobile Terminating (MT) messages (messages sent from server to cell phone) coming from the wireless network are handled by the Proprietary Mail Handler module embedded in the phone's operating system, which shows the incoming message on the telephone's screen and provides the user with a on-board mail management tool.

The J2ME Main Application (105) is the main application module running on the mobile device. This module interfaces with all other modules on the client-side and selects inputs and outputs from other modules as necessary. The client-side software also includes a Graphic User Interface (GUI) so that the user can interact with the system. This GUI will vary depending on the application at hand.

Figure 3:
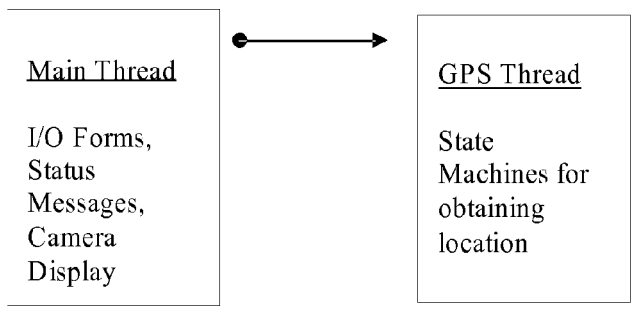
FIG. 3 is a general application diagram of the internal design of the software developed for the inventive system.

The internal design of the software of the phone divides the processing tasks between two major threads, as shown in FIG. 3. The main thread (J2ME Main Application 105) handles the user interface 100, including forms for taking pictures and sending data for processing to the server. Whenever one of the application programs is started, a GPS thread (J2ME GPS data processing agent 108) is launched that utilizes two state machines in an attempt to provide the greatest possible coordinate accuracy in the least amount of time. Since the input values to the Location API 109 (requested accuracy and timeout value) alter the behavior of the Location API, these two values can be changed to produce the desired behavior of the application. This optimizes the use of the GPS hardware and saves battery power based on the specific needs of the current main application, which are functions beyond the capability of the J2ME Location API. For example, if a tracking application is being used and the individual moves into an area that cannot receive a GPS signal, the state machine will recognize that GPS fixes are not being obtained and will start to query the Location API less frequently. Once the user gets back into coverage, the state machine will resume querying the Location API at a normal pace.

Figure 4:
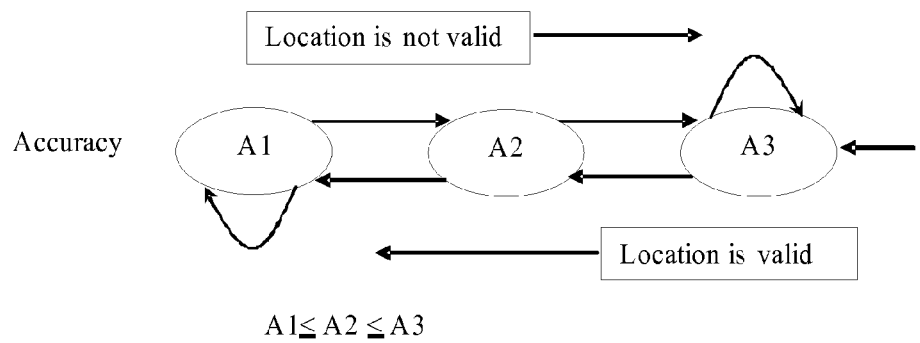
FIG. 4 is a GPS state machine block diagram (Accuracy).
Figure 5:
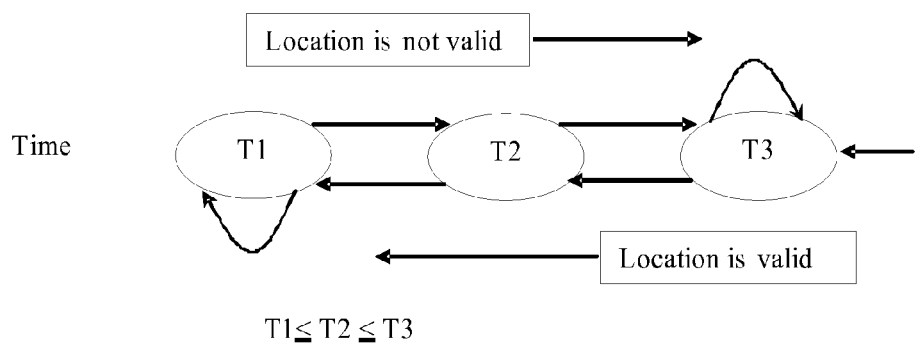
FIG. 5 is a GPS state machine block diagram (Time).

The state machines run by the GPS thread, illustrated in FIGS. 4 and 5, operate independently by attempting to obtain the greatest degree of accuracy for the location coordinates in the least amount of time. FIG. 4, the accuracy-related state machine, consists of three states, A1, A2, and A3, which represent the values 25, 50 and 100 meters respectively. The code initializes the machine to begin in A3, where it remains unless a location can be determined with a greater degree of accuracy, in which case it moves to the state on the left in the diagram. At any given time, therefore, the GPS thread can return the last set of coordinates with their related level of accuracy to the main thread upon request.

Simultaneously, the Time-related state diagram, FIG. 5, is keeping track of the number of seconds required to obtain the last fix. The three states below, T1, T2, and T3 return the respective values 32, 50 and 150 seconds. The machine begins in state T1, but if more time is required for obtaining the location than 32 seconds, the state is set at T2, and so on. I/O Forms, Status Messages, Camera Display State Machines for obtaining location Main Thread GPS Thread.

When the Main Thread requests the user's location from the GPS Thread, the value contained within the current states of the two machines are returned along with the coordinates. Based on these values, the application software is able to determine whether the location is valid according to the pre-specified criteria. If the criteria are not met by the results of the GPS Thread, alternative means of identifying the location of the phone, such as the coordinates of the nearest cell phone tower, are used instead.

Carrier Network

Figure 2B:
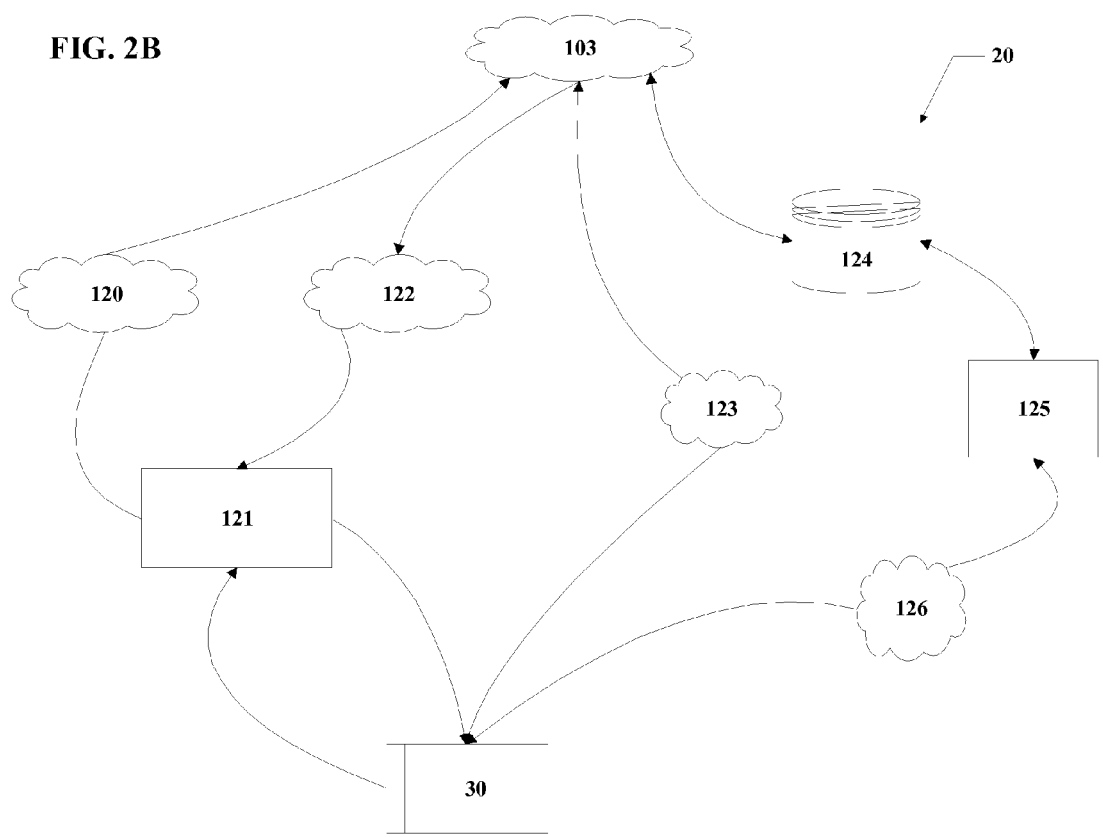
FIG. 2B is a block diagram illustrating the network module of the inventive system.

The end-user device 10a communicates first with the wireless network 20, shown in FIG. 2B, as the applications rely on wireless telephones and service. In this case, a wireless network was utilized that provides user position information that is accessible and programmable by applications running on the end-user device. These applications obtain locations directly from the J2ME Location API 109 (FIG. 2A), which queries the GPS chip in the user's telephone first and the wireless network later if GPS signals (or GPS chip) are unavailable.

There are tradeoffs between using software run on the end-user device versus software run on a web-server. Web services are available only to select commercial customers due to the overhead the carrier incurs when providing the service.

The wireless network 20 has a Public Messaging Gateway 121 that handles the MMS and SMS services. This gateway channels messages to and from the Internet and the user's telephone. Mobile Originating (MO) messages are addressed to applicationname@youremailserver.com, for example, and are automatically translated from the MMS format to emails at the gateway. Mobile Terminating (MT) messages are addressed to user-telephonenumber@messaging.provider.com, again only as an example, and are translated from emails to the SMS or MMS format at the gateway. Since Mobile Terminating SMS and MMS capabilities differ according to carrier, different results are displayed when sending messages to different public gateways (i.e., attachments may not be transmitted, message text may be capped at a certain amount, etc.).

For example, when sending video as an attachment to phones, the network converts a 10-second 0.3GP format video file into a 4-frame animated .GIF. wireless carriers can manipulate these messages as they wish in order to save bandwidth or storage space.

Internet Side

Figure 2C:
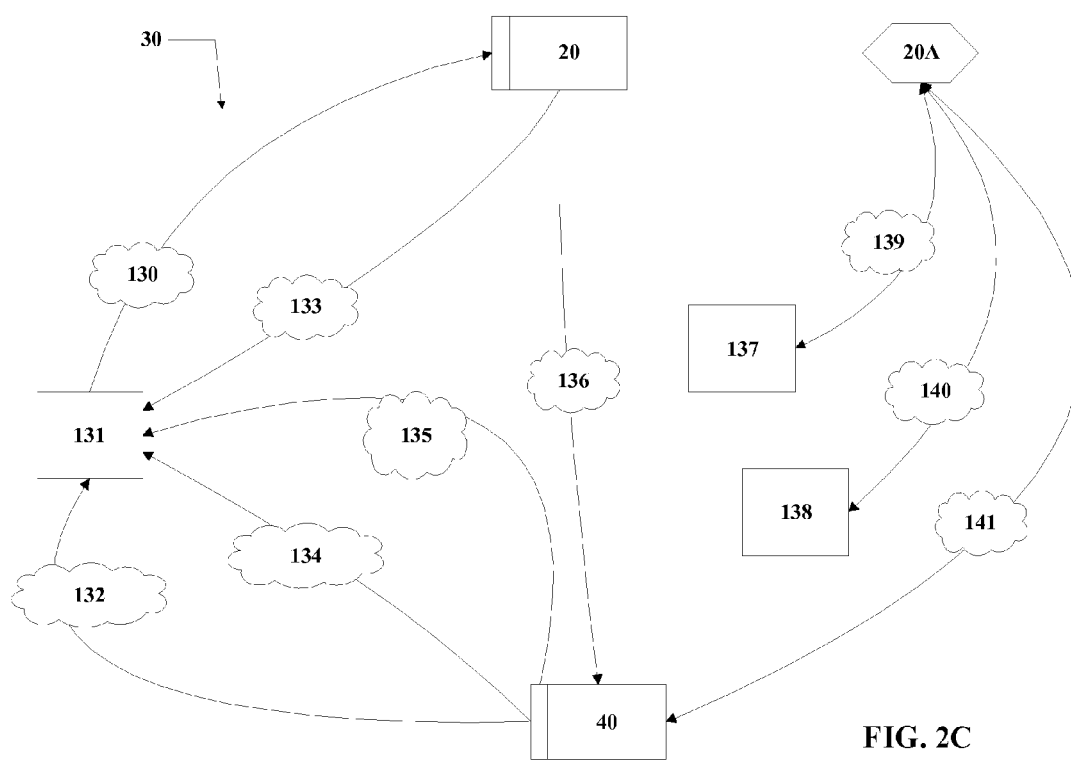
FIG. 2C is a block diagram illustrating the Internet module of the inventive system.

The Internet network module 30, shown in FIG. 2C, is the transport network that allows users to interact with the designed applications anywhere at anytime. This design uses two modules that rely on access to the Internet. The first module is an Email Server 131 to handle the delivery of incoming and outgoing (MO and MT) messages. The second module is the Maps Server 137 to process the user's position and display it on a geographical map viewed on a web page.

For the Email server 131, user and cell phone application MO messages travel from the carrier Public Messaging Gateway 121 (FIG. 2B) over the Internet and are delivered to the Email Server. MO messages are then retrieved by a Java Mail Client API located on the server-side where they are further processed. MT messages sent from the server via Simple Mail Transfer Protocol (SMTP) travel over the Internet to the Email Server, which then sends them via the Internet to the Public Messaging Gateway. Maps Server 137, allows a Web user to interact with the cell phone user. For instance, the architecture includes necessary modules that not only show the location of the users on a map, but also allows the selection of any user shown on the map and enables the capability to send a personalized massage back. No other point-and-click bi-directional location-based messaging capability was known to exist in any other multimedia messaging system. Further, the Web Page Interface 20a allows for the selection of many users within a certain geographic area and the capability to broadcast a message to all of these selected users at once.

An additional function that is available is Voice-Over-IP (VoIP) server 138, such as a desktop application capable of calling regular landline and mobile telephone numbers. By clicking on the "Call" link within a message, the cell phone's telephone number is transferred to the Skype application and a call is automatically initiated. The cell phone will ring as though a normal telephone call was incoming, and the web page user can use the computer microphone and speakers to listen and talk to the cell phone user. With the current capabilities of VOIP, the web page user can select up to four cell phones and initial a conference call between them. As each cell phone user answers their phone, they will be added to the conference call.

Server-Side

Figure 2D:
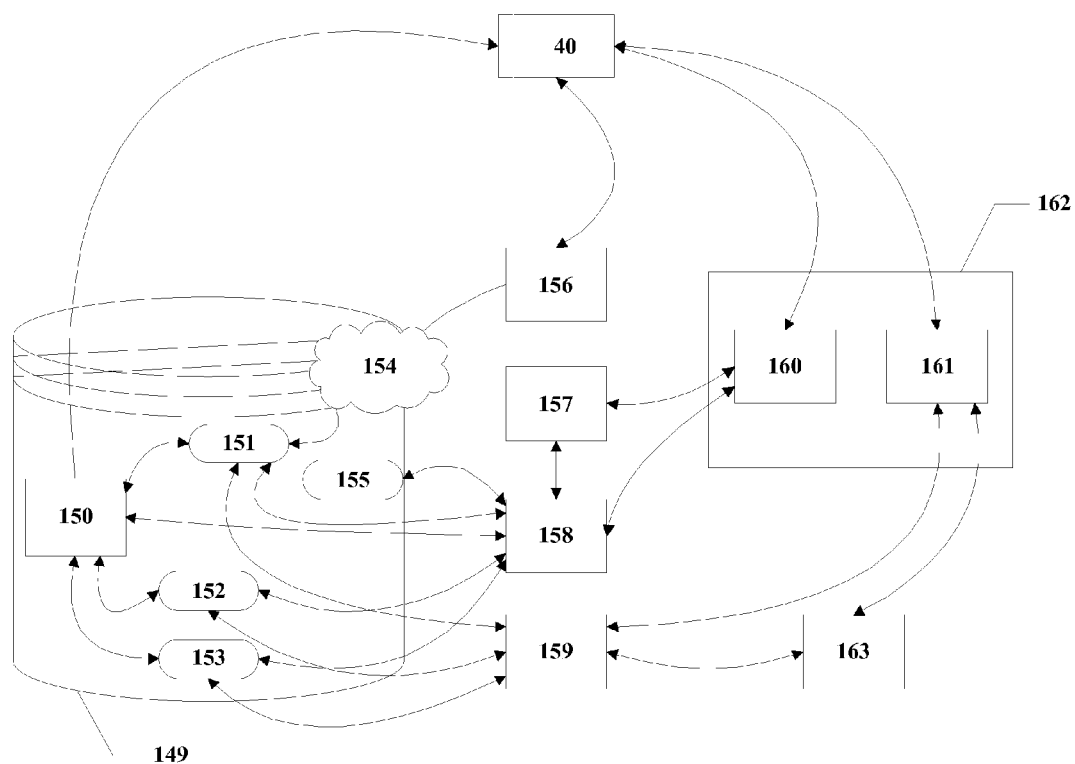
FIG. 2D is a block diagram illustrating the server module of the inventive system.

The server-side module 40, seen in FIG. 2D, is the most complicated component of the architecture. To satisfy the requirements of all the supported applications, several modules are included. It follows that some applications will only use some of the modules. The architecture includes an Database Server 149 used to store MO and MT messages 151, user and device profiles 152, specialty data 153 such as bus stops locations, bus routes, subscription lists, and a Geographical Information System (GIS) database 155 used for comparing user position information to geographic maps such as those of evacuation zones. In addition, a Transactional SQL (T-SQL) module 150 is used to trigger and schedule the other modules when needed. For example, it instructs the VB.NET Data Processing Agents module 158 how and when data needs to be stored/accessed and triggers VB.NET Specialty Algorithms Agents 157 when their function is requested. It also has the ability to generate automated SMTP emails when necessary. Again, its main functionality is scheduling tasks and triggering functions within the database server.

The second part of the server-side component are the communication agents. To have the Microsoft .NET and the Java environments running simultaneously, communications modules were replicated in this part of the architecture because certain tasks can be accomplished in a considerably easier way in one particular environment versus the other. For example, all direct communication between the server-side and the client (direct TCP/IP, UDP, or HTTP link) are easily handled using the Java environment and multiple Java servlets. On the other hand, .NET is the preferred environment to use for complex GIS processing through the ESRI ArcObjects utilities and for web service communication via XML. .NET is also required for complex synchronization of a SQL Server Mobile Edition database that runs on .NET Compact Framework devices (mostly PDAs) with a SQL Server 2000 or 2005 database. As a result, both an Internet Information Services (IIS) Web Server and an Apache Tomcat Web Server 162 were incorporated. In addition, modules to handle the data in each environment for Microsoft and Java-based data processing 159 and specialty algorithms 163 modules are included. The Data Processing Agents (DPA) handle how data are stored and accessed in the appropriate databases while the Specialty Algorithms Agents (SAA) run algorithms that work on the data supplied by the processing agent and return a response. For example, the DPA provides the SAA with the user position from the database, and the SAA utilizes these data along with the GIS map data, also obtained by the DPA, to find the evacuation zone in which the user is currently located. The determined evacuation zone is then passed back to the DPA, which then stores this new data in the database and schedules it for delivery back to the user. Finally, the Java Mail Client 156 retrieves the MO messages from the Mail Server and parses them so the message and the position information of where the message originated from can be stored in the database.

Architecture Implementation

Figure 6:
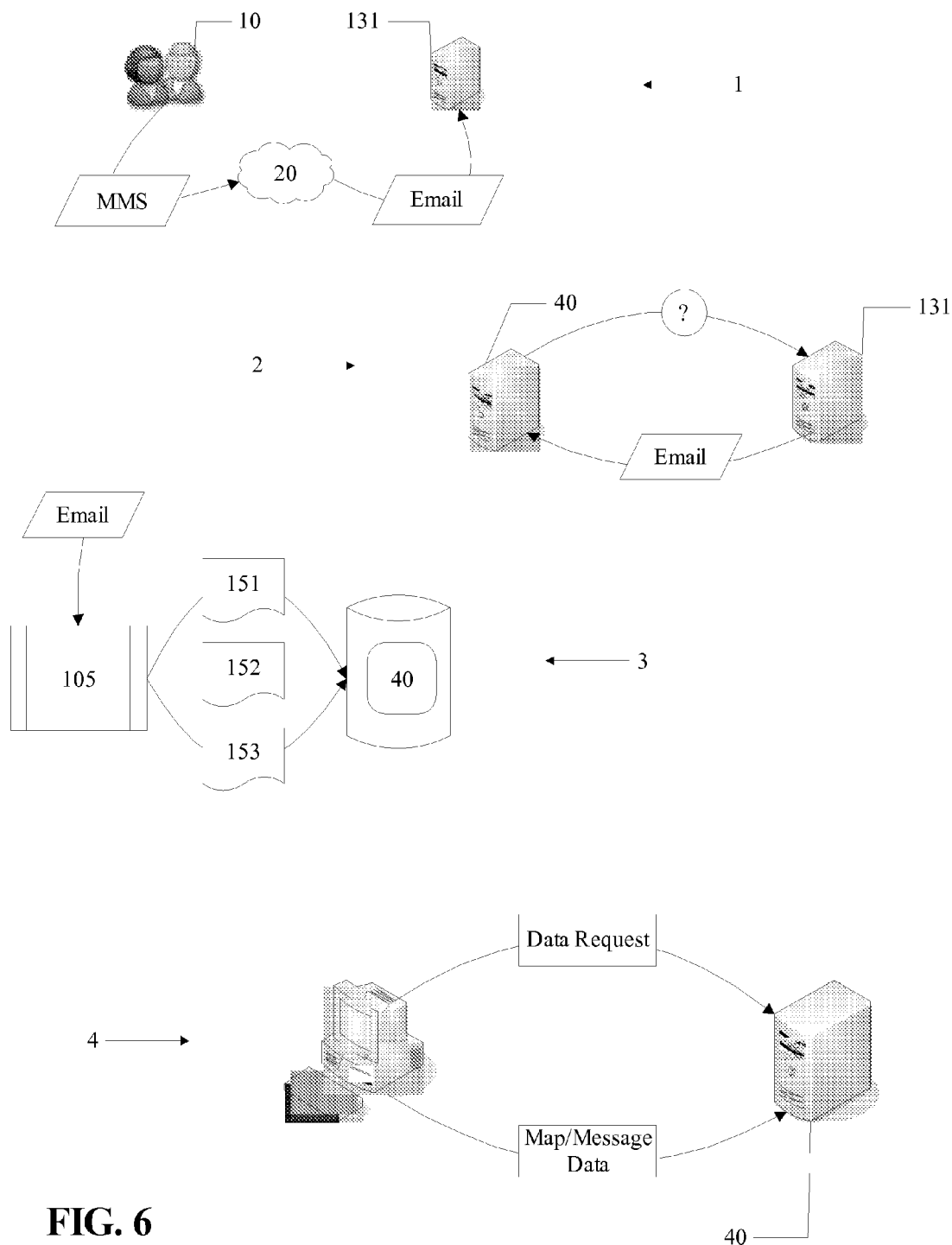
FIG. 6 is a block diagram showing data flow where a Cell phone submits a multimedia message.

Using the architecture defined above, various applications utilizing two-way location-based multimedia messaging can be implemented. The flow of execution in the system when the cell phone user submits a message is shown in FIG. 6. In step 1, the cell phone user 10 runs a custom application on the cell phone, which captures either a picture or video. The application then packages the picture or video together with the GPS data for the phone's current location into a Multimedia Messaging Service (MMS) message, which is addressed to the email address assigned to the server. The carrier network 20, in step 2, translates this MMS message into an email and delivers it to the mail server 131 handling the email for the destination email address. A custom application on server 40 then uses the JavaMail API (159 in step 3) to retrieve the email from the mail server 131, parses it into the message 151, picture or video 152, and GPS data 153, and stores this information in a database 149 (step 3). If the message contains a video, custom software using the Java Media Framework (JMF) and Ffmpeg Objects (FOBS) breaks it down into frames, extracts one frame per second of video, and then compiles the extracted frames into an animated GIF image. In step 4, a custom webpage retrieves the message, picture and location for each incoming message and displays them as points on a map. When the user selects a point, the message contents along with the picture is shown. Specialized functions are provided through software running on the server. For example, an animated GIF is then used as a thumbnail image for the video in the sidebar of the webpage. When the web page is viewed, this information is then pulled from the database, processed by a JavaScript application, and displayed in the form of markers on a Google Map. When a marker is clicked, the message contents along with the picture or video are displayed to the user.

Figure 7:
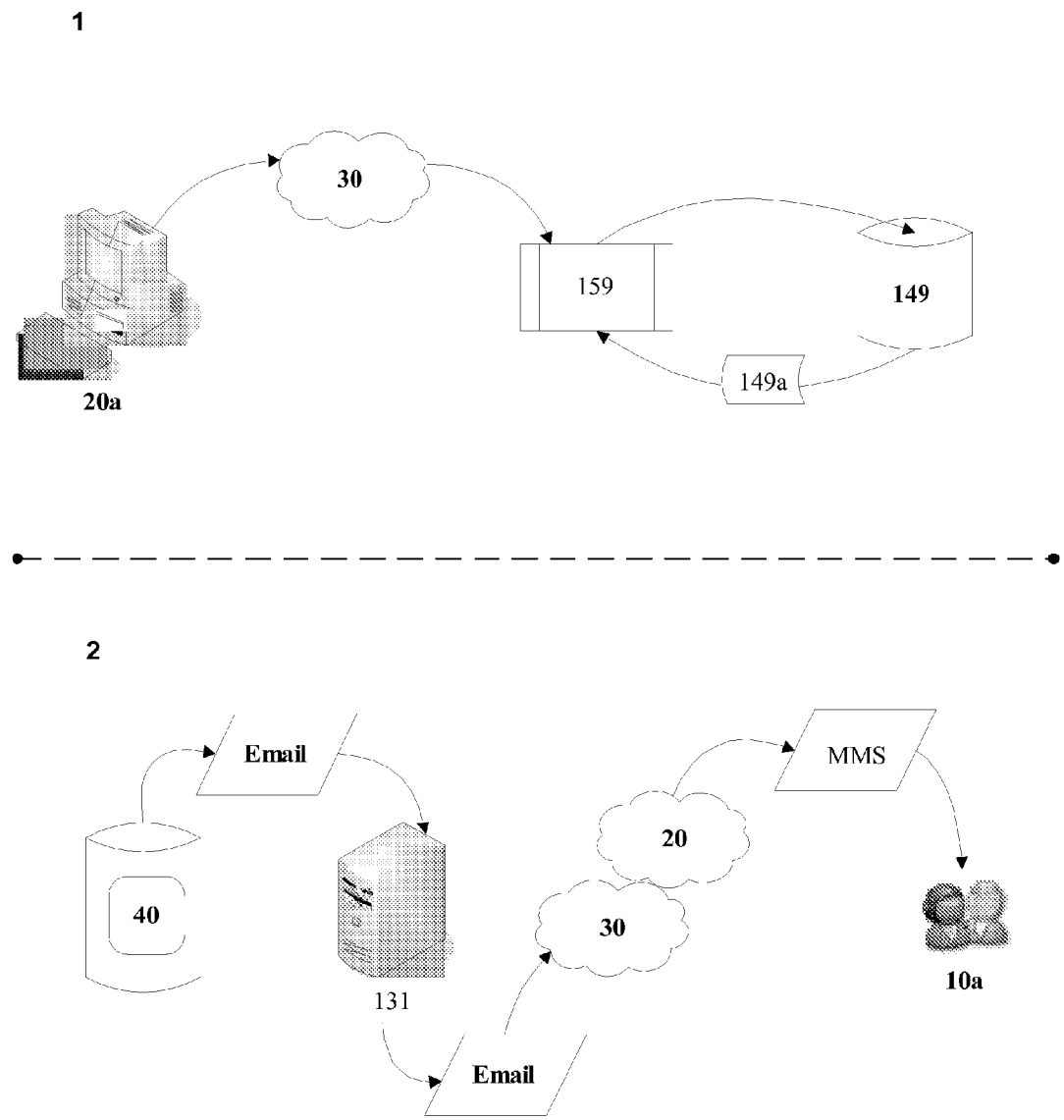
FIG. 7 is a block diagram showing data flow where a web page user sends messages to cell phones.

To send a message back to the cell phone from the web page, another aspect of the architecture is utilized, as shown in FIG. 7. In step 1, user 20a selects a map area on the custom web page, a JavaScript application 159 uses information 149a gathered from the database 149 to determine which messages originated within the area circled on the map. The system moves to step 2 once it is determined which phones are within this area. The software sends a message to each phone by sending the message, addressed to the cell phone's public email account (i.e. phone_number@carrier.com), to a Simple Mail Transfer Protocol (SMTP) mail server. The SMTP server 131 will then send an email to the cell phone's address, which will travel through the Internet until it reaches the carrier's network. At the carrier's network, the message will be translated into an MMS message and relayed to the cell phone. The message will then appear in the cell phone's Inbox for new messages.

Figure 8:
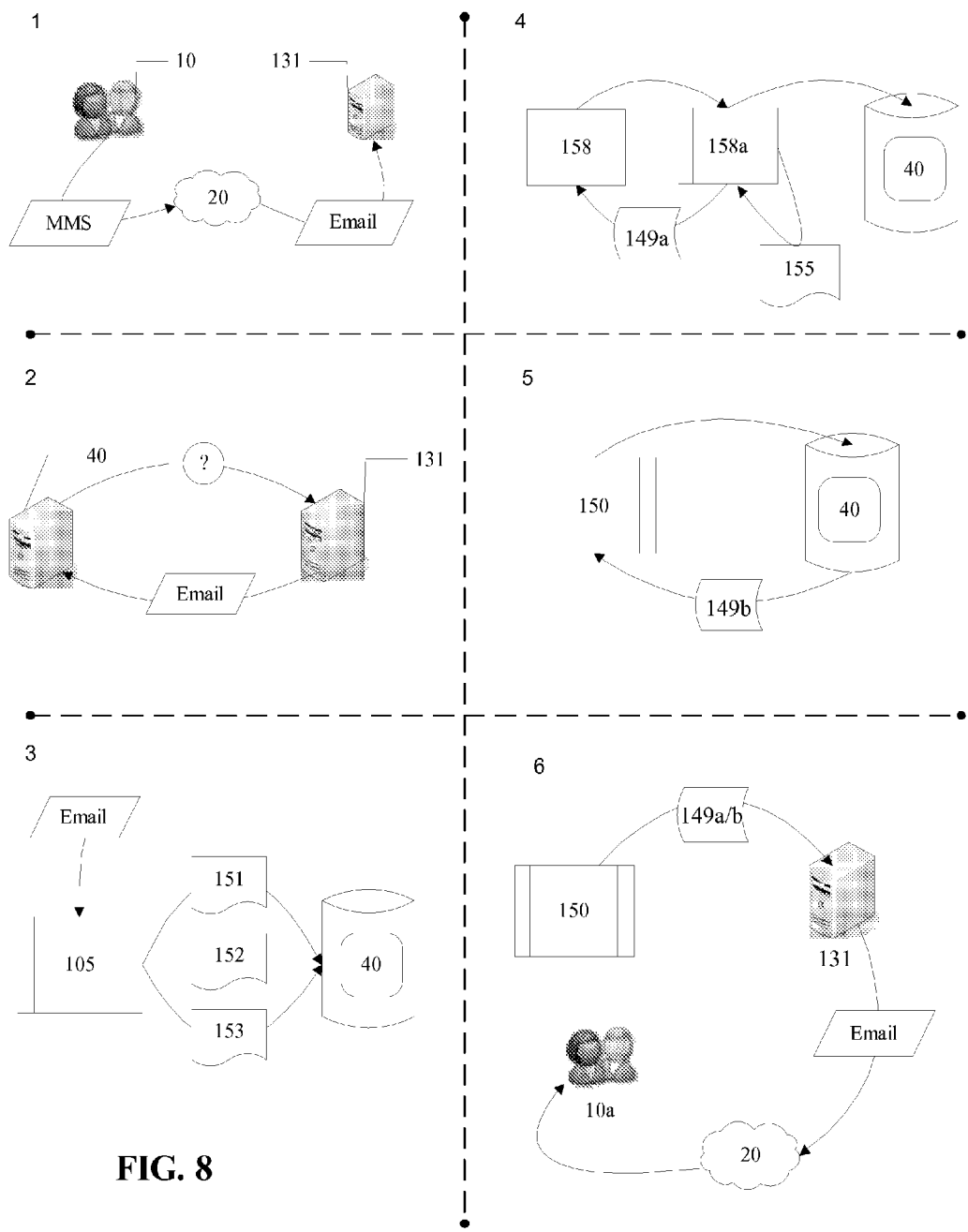
FIG. 8 is a block diagram showing data flow where a cell phone requests an automated mapping application.

For automated applications such as the Hurricane Evacuation Zone finder, a slightly more complex process takes place, as shown in FIG. 8. Step 1: the user 10 runs a custom application on their mobile phone, which determines the current GPS location of the phone and sends this via a MMS message to the mail server 131, where it is processed and parsed by another application into the message and location data components. This information is then stored in a database in steps 2 and 3 as before.

In step 4, a VisualBasic.NET application 158, using ArcObjects 158a sees that a new message has arrived and begins to process it. It compares the location of the mobile phone against stored GIS map files 155 of the Evacuation Zones in Hillsborough County and then stores the appropriate Evacuation Zone letter in the same record in the database. A T-SQL script 150 (Step 5) then runs and gathers any evacuation zone information 149b that has not yet been sent to the mobile phone. Finally in step 6, the T-SQL script 150 then packages this information 149a/b into a message and sends it to the SMTP mail server 131 where it is then forwarded to the cell phone 10a, where the mobile phone user will see it as an incoming message in their Inbox.

Position-based applications rely on the availability of end-user position information. Currently, this information can be derived using three types of position determination techniques: end-user device-based methods, wireless network-based methods, or hybrid methods. In device-based methods, the end-user device performs the necessary measurements and position calculations. Network-based methods determine the user position inside the network, which is either stored in the network some place or sent to the end-user device.

There are also hybrid methods in which end-user devices perform measurements and send the information to the network, where the position calculations take place or vice versa. In the former case, the method is called device-assisted network-based positioning, and, in the latter case, it is called network-assisted device-based positioning. These hybrid methods are sometimes used to improve the Time-To-First-Fix (TTFF) and the accuracy of the position estimation.

Since these methods can be implemented in different ways, the FCC E911, in its Phase 2 mandate, has left the implementation of the positioning system technology up to each carrier and has only specified accuracy requirements. In the case of network-based (device-based) solutions, 67 percent of the calls must be within 100 (50) meters, and 95 percent within 300 (150) meters.

Device-Based Positioning Methods

This positioning method relies on the GPS satellite system and utilizes hardware and software that resides in the end-user device. Many cell phones and some PDAs are equipped with low cost and low power GPS receivers that are used to receive the signals from the satellites. The GPS system is a constellation of 24 satellites in the Medium Earth Orbit (MEO) that allows end-user devices to calculate their position using the Time of Arrival (TOA) method and applying circular lateration in combination with timing measurements. The constellation consists of six orbits spaced 60 degrees apart from each other with four satellites per orbit that guarantees that a GPS receiver is under the coverage of at least four satellites at any given point in the Earth's surface.

The main advantage of GPS is that very high-accuracy location data can be obtained, within 3-5 meters in ideal scenarios. This extreme level of accuracy allows for the development of realtime applications that interact with the users based on their current position, such as vehicle navigation software. However, several disadvantages also exist. First, since the GPS transmissions from the satellites are very weak, the device must have a clear view of the sky to receive the transmissions used to calculate its position. This means that pure GPS positioning solutions do not work indoors or in situations where radio signals may be interrupted, such as during severe weather or in "urban canyons" (areas surrounded by many tall buildings).

GPS devices can also take a significant amount of Time-To-First-Fix (TTFF) (up to 2 minutes or more) when the GPS hardware is first turned on. This scenario, referred to as a "cold-start," results from the GPS hardware having to scan many radio channels to figure out what satellites may be in view. Subsequent fixes, referred to "warm" or "hot" starts, depending on the idle period, can be obtained at a faster rate up to approximately every 2 seconds.

Network-Based Methods

There are many network-based positioning mechanisms are available in wireless wireless networks. In the United States, these mechanisms have been introduced mainly because of the E911 mandate that requires carriers to provide positioning information for emergency calls. The FCC executed the E911 mandate in stages, requiring the end device position to be determined within a "cell" (the area of wireless network coverage) by 1998, and more accurate position information by the end of 2005. The Cell ID positioning method, which simply returns the position of the center of the cell with which the device is currently communicating, varies in accuracy based on the size of the cell (anywhere from 100 m in urban areas with high density wireless coverage to 20,000 m in rural areas with sparse coverage).

To meet the more stringent requirements of E911 Phase 2, more advanced mechanisms have been developed, such as the Enhanced Observed Time Difference (E-OTD), Time Difference of Arrival (TDOA), and Uplink Time Difference of Arrival (U-TDOA). To calculate the user's position, most of these mechanisms utilize the Hyperbolic Lateration mechanism, which is similar to the well-known circular lateration mechanism. In these mechanisms, wireless base stations are utilized as fixed position references similar to the satellites utilized in the GPS system. In other methods, positioning calculations are performed by the network after collecting enough information from the end-user device and close base stations.

Network-based techniques have the advantage of using wireless signals in order to determine position information, which eliminates the "clear view of the sky" restrictions that applies to GPS. Therefore, network-based methods are able to determine the position of a device wherever it can receive wireless signals, including indoors and within urban canyons.

However, network-based solutions are not able to supply the extreme levels of accuracy associated with GPS. These solutions can accurately supply data up to approximately 50 meters, which limits their use for certain positioning applications. So far, the U-TDOA method is perceived as the best option to meet E911 accuracy requirements; however, this may vary in the future.

Hybrid Positioning Methods

In an attempt to combine the advantages of both device and network-based solutions, some "hybrid" positioning technologies such as Assisted GPS (A-GPS) have been developed. AGPS uses standard GPS signals in coordination with network-based techniques, such as Advanced Forward Link Tri-lateration (AFLT), to obtain highly accurate positioning information, averting limitations of pure GPS. For example, the Time-to-First-Fix can be significantly reduced if the GPS device is supplied with an estimate of where it may be located and which satellites are in view. The wireless network can provide the location of the wireless device, allowing it to focus on fewer satellite radio channels in view. This hybrid method also provides a network-positioning backup for scenarios where GPS may be not available. For example, Nextel phones utilize an A-GPS method to obtain positioning information for third party software running on the handset. If the GPS hardware cannot obtain an accurate fix within a given timeout period, then the J2ME Location API provides the known location of a nearby wireless tower (Cell ID) along with a message stating that a highly accurate GPS fix was not obtained. Even though the Cell ID position accuracy can vary depending on the size of the nearby cell, some location data will be reported back to the application.

Software Developer Methods to Obtain Position Data

While different technologies are used to calculate the user's position, software developers should not be subject to differentiating one type of technology from another. Luckily, the J2ME Location API hides much of the implementation details from the developer and allows them to focus on creating position-aware applications for end-user devices. However, it does help to have a basic understanding of how the API interacts with the network in order to make the application react properly to the output of the API. This section discusses the J2ME Location API for cell phones as well as the more recently developed Location-Based Services API (LBS API) that can be used to obtain a cell phone's position from a web application.

J2ME Location API

To obtain GPS data from software running on the phone, the developer needs to simply call a function in the "Location API" defined by Java Specification Request (JSR). The "Location API" handles the low-level interface with the end-system device hardware and returns the requested GPS data to the application regardless of the type of technology or method of implementation that actually calculates the user's position.

Although the Location API greatly contributes to the transportability of an application from one phone or carrier to another, the API is not applicable in all cases. For example, prior to the release of Model i860 cell phone, Motorola allowed the use of only the Motorola OEM Location API with their phones. However, newer phones (i860, i870, etc.) now support both the Motorola and the J2ME Location APIs. This causes some confusion when developers are referring to general concepts and examples, because there are some significant differences in the implementation of either API in location-enabled software.

While trade-offs are not discussed in this report, the one property that merits mention is the transportability of the code. In theory, the code using the J2ME Location API should be transportable to other phones and carriers, while the code using the Motorola OEM Location API is limited to only Nextel Motorola handsets. Although Nextel is currently the only carrier to allow third party developers access to programmable positioning functions on handsets, more carriers will provide similar access as their position systems mature.

Some phones utilize an A-GPS method, so there are data supplied by both the handset and network when obtaining position information. When the developer places the function call to the J2ME Location API, they must define a criterion for the desired accuracy of the GPS fix as well as a timeout value of how long the function should search for a fix before it returns. Assuming that this is a request for a first fix (a cold start), the phone will try to obtain and utilize network information (the position of a nearby cell tower) that can lessen the TTFF. If the GPS hardware cannot obtain a fix that meets the provided accuracy criteria within a given timeout period, then the J2ME Location API will provide the known location of a nearby wireless tower to the application along with a note that a high accuracy GPS fix was not attainable. If a GPS fix can be obtained, it will be returned to the user along with other information including the estimated accuracy of the GPS fix based on the available signal and the number of available satellites. Subsequent "hot" fixes will not contact the network to obtain cell information since the GPS position of the phone is already known and should return new fixes rapidly unless there is a problem with the GPS signal. If the application does not query the J2ME Location API for an extended amount of time, the GPS hardware will have to begin from the "cold start" state again.

Developing software that reacts properly to each of these scenarios while adjusting the criteria for accuracy and timeout values accordingly before the next GPS fix is requested will greatly enhance the execution and performance of a location-enabled application. In the detailed architecture diagram shown in FIG. 2A, the J2ME GPS data processing agent performs these tasks to optimize efficiency and performance of the interaction between the J2ME Main Application and the J2ME Location API, thus increasing the performance of the application as a whole. The J2ME GPS data processing agent can also be optimized to react to different scenarios based on the performance of the system hidden behind the J2ME Location API. For example, the J2ME GPS data processing agent can adjust the accuracy and timeout values for one implementation on a carrier that utilizes a network-based positioning solution, or it can adjust to a device-based positioning method utilized by a different carrier.

LBS API for Web Applications

A Location-Based Service (LBS) API is a web service that can be queried by a web application server for a specific phone location without having to install any third party software on the cell phone. A LBS API simply aggregates position information for many cell phones that are connected to the network and makes data available to external web applications. A LBS API draws from a repository referred to as LBS Database that contains position information obtained by whatever location method is utilized. In the case of device-based positioning methods, the position information in the LBS Database is calculated by each phone and then silently passed to the repository by proprietary communication methods. Then, the information is made available to web applications. In the case of carriers utilizing pure network-based positioning methods, the J2ME Location API software on the phone draws position information from the carrier network repository that contains location data calculated by the network and then makes it available to the application running on the cell phone.

When queried by a web application, the LBS API will immediately return the position of the phone in an Extensible Markup Language (XML) format to the web server that initiated the request if the LBS Database has current knowledge of the requested phone's position. If the phone's position is unknown, the LBS API will attempt to obtain and return the phone's position within a specified accuracy and timeout period. The web application must have the proper permissions from both the carrier and the end-user to access the phone's location over the Internet.

Utilizing the LBS API via HTTP communication (web applications) to obtain the position of a phone has advantages and disadvantages over client-side applications utilizing the J2ME Location API. The most obvious advantage is that no software must be configured, distributed, installed, and maintained on many different types of end-user devices. In addition, the LBS API application is simpler to design because it does not have the restrictions of a small profile device and does not have to anticipate and handle frequent interruptions in execution caused by events, such as incoming or outgoing phone calls.

However, because the LBS API is a web service controlled by the carrier, certain restrictions can be placed on the number and frequency of requests made by a web application for a specific phone's location. For example, some providers place restrictions on the LBS API that limits the frequency of requests to once every 10 minutes per phone and the total number of requests to 72 per phone per day. Therefore, once a position of the phone is initially returned, there will be a 10-minute lag to return the new position. Additionally, the LBS API will prompt the phone for its GPS position data only twice before returning a Cell ID position to the web application.

Third party software using the J2ME Location API on the cell phone is not subject to these restrictions. It can query the phone every 2 seconds and is able to have an unlimited number of requests. The developer can also specify that the code continue to query the cell phone until a GPS fix is returned. Because of these differences, the developer must consider the nature of the application being developed before choosing cell phone software or LBS API development. For high-accuracy tracking applications that require position information every few seconds (such as real-time vehicle navigation software), the J2ME Location API with client-side software must be utilized. However, for some location-enabled messages services that occasionally need to obtain a phone position in a single request, a web application utilizing the LBS API may be preferable if appropriate access can be granted by the carrier and the individual being tracked.

For this invention, the J2ME Location API was determined to be the appropriate choice. Currently, web services are available only to select commercial customers due to the overhead the carrier incurs when providing the service. Additionally, each user being monitored would have to give permission and have their accounts altered internally by Nextel, which would not be feasible in an emergency. The J2ME Location API is not subject to these same restrictions, as the user would simply have to download and run the application. Therefore, while the LBS API could easily be integrated into the architecture in the future, the J2ME Location API was chosen as the primary location data mechanism for the architecture.

The Wireless Safety Security System

The focus of implementation using the location-based multimedia messaging architecture for this invention was the next-generation software-based dispatch center. Using this system, mobile telephone users become additional sets of "eyes and ears" for law enforcement, emergency dispatchers, and first responders as these civilians can report incidents by sending text messages, pictures, and/or video clips to officials in real-time. These messages are then plotted on a map to show their current location and made viewable on a webpage, accessible from any laptop or PC with Internet access.

Sample applications for the system include the reporting of suspicious incidents by Neighborhood Watch groups, citizen responses to Amber Alerts (missing child alerts), reporting of traffic incidents, terrorist attacks, and virtually any other public emergency. Since the position of the reporting individual's cell phone is known to the dispatcher, the emergency official can immediately see where the user is located in relation to nearby streets and landmarks and dispatch the appropriate units based on the location, scale, and urgency of the situation. Additionally, if more users report a suspicious person as he or she moves, the central station's agent will be able to track the offender's path in real-time by instantly viewing the pictures or video plotted on the map in the web page as they are being remotely submitted.

Access to the system webpage is restricted to only those with an authorized user name and password. All new users that sign up for access must first be authorized by the appropriate party.

Since no special hardware or software is required to view the main dispatch web page, the system offers a flexible and portable solution in case of emergencies or natural disasters where physical access to a normal centralized dispatch center could be restricted. Any method of data communication that allows access to the Internet from a PC or laptop can be utilized to view the web page, including wired connections such as dial-up, DSL, or cable modems or wireless connections such as Wi-Fi, wireless data service provided by a cell phone carrier, Wi-MAX, or a satellite modem. This flexibility and reliance on standard communication methods ensures that if any method of data communication is possible, the system remains accessible and the continuity of emergency operations remains intact.

Another advantage of hosting the system through a web page is the redundancy and scalability of the system. The web server could be co-hosted in several locations across the country, guaranteeing that a backup stays operational even if a large amount of local infrastructure is destroyed. As network traffic increases, additional computing resources can be added to handle this increased load. Additionally, since a web page can be accessed by many simultaneous users, a large amount of people can view the same information first-hand from around the community, state, or nation, ensuring that all emergency officials get a firsthand view of the current situation.

The system also allows each viewer independent use of the system so each individual could simultaneously focus on different map areas and control what messages and locations are currently being viewed on their local Internet browser window. A single dispatcher could also open multiple sessions through several Internet browser windows and monitor several different locations simultaneously.

The system map shown on the webpage utilizes the easy-to-use Google® Map interface. The dispatcher can easily change current view of the map by clicking and dragging the map in any direction or by clicking on the four directional arrows in the upper left-hand corner of the map. Doubleclicking on a point on the map will automatically center the map on that location. Zooming in or out is performed by clicking on the plus (+) or minus (−) buttons just below the four directional arrows. This feature allows the dispatcher to easily zoom in see a very fine resolution of distance (down to a matter of feet), or they can instantly zoom out to view conditions on a statewide, national, or even international scale.

The dispatcher can select one of three modes to control what kind of mapping data is shown: "Map," "Satellite," and "Hybrid." The normal Map mode displays a traditional street map. This mode is useful for quickly identifying nearby streets by name. Satellite mode replaces the street map with photographic images taken from satellites. Hybrid mode overlays street map information on top of the satellite imagery. Satellite imagery allows the dispatcher to recognize quickly a location in reference to commonly known buildings and visual landmarks.

On the website is a list of messages sorted by time, with the most recent submissions at the top of the list. Each item in the list shows a small version of the picture or video, called a thumbnail, next to the date and time that the message was submitted. By clicking on the marker on the map or on the item in the list, the dispatcher can view detailed information about that particular message. When a message is clicked, the map centers on that message and an information window is opened. This window displays a unique message ID for this message, the phone number of the person that submitted the message, the time and date it was submitted, and the type of information used to obtain the user's location. The "GPS Method" can be either "Satellite Fix" or "Cell ID," whose meaning are discussed below. The information displayed also includes the approximate direction the individual was facing when they submitted the message.

The webpage displays text, picture, and video attached to messages in slightly different ways. Text messages from the cell phone user appear in the information window just below the "GPS Fix" field. If the message contains a picture, a large thumbnail of the picture appears in the information window. If the user clicks on the image thumbnail, it will be opened in a new window in its full size and resolution. The dispatcher can then examine the photo carefully and see details that may not be at first evident when viewing the smaller thumbnail.

If the message contains a video clip, a video player plug-in is launched when the dispatcher clicks on the marker or the item in the list. A video message can also contain audio, which is played to the user in sync with the video. The "estimated accuracy" of the location information that was determined for the cell phone is represented by, for example, a circle surrounding the marker, and it is shown when a message is clicked if the "GPS Method" for obtaining the phone's location was a "Satellite Fix." This means that based on the system's determination, the real geographic location of the cell phone that sent this message should be fall somewhere within this circle of error. This circle's radius usually varies from 3-20 meters and has generally be found to be a conservative estimate of accuracy for GPS location data from a satellite fix, and in the research team's experience the location of the marker has accurately represented the location of the cell phone within 3-5 meters on a regular basis.

If a GPS satellite signal cannot be obtained (i.e., the cell phone user in indoors), the "GPS Method" will be listed as "Cell ID" (This is presuming the use of Nextel's wireless network, although other networks may be able to provide other more accurate location data without using GPS). "Cell ID" means that this marker represents the location of the cell phone tower with which the cell phone is communicating. Since the location of the tower is known, no "estimated accuracy" information is given and no circle is drawn on the map. Cell phone towers have varying areas of coverage depending on their location, although in urban areas the location of the cell phone could be as close to 100 meters of the reported location of the nearby cell phone tower. More technical information on how the estimated accuracy value is obtained.

Once the dispatcher views a particular message, they have many options of what they can do to respond to that message. Three links appear at the bottom of the information window for each message: "Email," "Call," and "Forward." By clicking "Email," the dispatcher can send a written message back to the cell phone, complete with multimedia attachments. This feature could be used to give recorded audio instructions to the person or send them a photo of a missing child or suspect.

If the dispatcher wants to instantly talk to the cell phone user, they can click on the "Call" link. Using Voice-Over-IP (VoIP) technology, the dispatcher will instantly be connected to the cell phone user and the cell phone will begin ringing as if it is receiving a normal telephone call. The dispatcher can use a headset or simply the computer microphone and speakers to carry on the conversation with the cell phone user. This convenient feature allows the dispatcher to call instantly any local, long distance, or international number by just a click of the mouse with only an Internet connection required at the dispatch station PC or laptop.

If the dispatcher wants to forward an important picture or video to other individuals, they can click on the "Forward" link. This feature opens a window similar to the "Email" link, except that the dispatcher can type in email addresses to which they want to forward the message information. Multiple addresses must be separated by a semicolon. The body of the email also includes a link back to the website that, when clicked, will open the message in question so the recipient can see the exact location of the message. The person receiving the email must have an authorized account to access the webpage.

If the dispatcher wants to communicate with more than one individual simultaneously, there are additional functionalities accessible from the toolbar located at the top of the page to facilitate these actions. To send a message to many cell phones located in a certain geographic area, the dispatcher may click the "Email" icon. They are then prompted to draw a circle on the map where their broadcast will be directed and to fill out a message form where multimedia files can be attached if desired. This "reverse 911" feature could be used to direct individuals in a certain area to move away from dangerous conditions such as a chemical spill, or to direct drivers away from a traffic incident. Another possible use could be to distribute photos of a suspect or missing child to the public in the area where the person was last seen.

The system also provides the dispatcher with a unique capability of creating a conference call with multiple wireless phones simultaneously using the VoIP technology. By clicking on the "Conference Call" icon, the dispatcher can view a list of numbers to conference call. They can then click on the phone number shown in the information window for specific messages to add those phone numbers to the list. After the dispatcher has chosen the phone numbers they wish to call, they can click on the "Submit" button to dial automatically each of those numbers. Each cell phone will ring as if a normal call is coming in, and if the user picks up their phone they will be added to the conference call.

Other management tasks are possible using other buttons on the top toolbar. By clicking on the "Search" icon, the dispatcher is displayed a series of search boxes that allow them to filter what messages are shown on the webpage. The dispatcher can choose to display messages only between a specific start and end date and time, from a specific phone number, or only a specific message ID on the map.

Another icon, the "Manage Real-Time Tracking" button shows a control panel that allows the dispatcher to turn on or off the ability to monitor messages as they are being submitted in real-time. This feature is useful if the dispatcher wants to review only archived messages in a certain window and wants real-time submissions to appear in a separate WI-VIA web page window.

Yet another icon, the "Zoom To" button, allows the dispatcher to center the map on any address. This feature could be useful if the dispatcher wants to switch back and forth quickly between different areas of interest without having to click and drag the map or zoom in and out repeatedly.

Software was also developed to run on the wireless phone. When started by the user, an opening screen is displayed allowing them to select between capturing a picture or video. If the user chooses the "Pics" option, they will then be shown a view of the camera inside the display screen of the phone. When the user is ready to take a picture, they will click on the "Capture" button. The phone will then capture the picture and automatically send it to the server where it is processed and stored for display on the webpage. After the transfer is complete, the phone displays the main screen again and is ready to capture another image.

If the user chooses "Video" from the main menu, they will be transferred to the screen in. Clicking the record button will record a short video clip with audio (up to 10 seconds) and then will notify the user that the video was captured. The user must then click on a "Send" button to transfer this video to the server, which will again display the screen. From the main menu, the user also has an option to send a "GPS Update" to the last message that was sent. This feature is meant to be used if the cell phone was not able to acquire a high accuracy GPS satellite fix during the time that the first image was captured and transferred. Once the cell phone has had more time to acquire this kind of fix, the user can then transfer this updated information to the server where it will be displayed on the map.

The Evacuation Zone Finder

The evacuation zone finder is an application that allows cell phone users to discover their evacuation zone in case of emergency hurricane and flooding evacuations. Given the number of hurricanes that have hit the U.S. recently, this application provides useful and timely information to individuals in case of emergency or for prevention purposes.

Often emergency call centers are overwhelmed by simple questions such as "What evacuation zone am I in?" and "Is my evacuation zone currently under a mandatory evacuation?" These questions could easily be automated using GPS-enabled cell phone technology, which would alleviate some of the unnecessary calls from emergency centers and let them focus on true emergencies that require human interaction. An application was developed that provides the user with their evacuation zone information by simply running the program on their cell phone. The application obtains the GPS coordinates directly from any GPS-enable telephone and transfers this information to the server. Once the user's position is known to the server, it compares the user's position to the GIS database where the evacuation zones are stored. The server then assembles and sends a text message back to the user with information about their evacuation zone and whether they are under a mandatory evacuation.

The user's view of the application runs on their wireless phone. Once the user starts the application they will be prompted to move outdoors so a GPS fix can be obtained. This could take approximately 20 seconds to 2 minutes. Once the cell phone is able to obtain the user's location, automatically transfers this information to the server, and shows the screen. The user may exit the application at this time, and they should receive a text message delivered to the cell phone shortly with their evacuation zone info.

The user runs phone application, then receives text message back: "Evacuation Zone=B. Evacuate when sustained winds=96+mph, Tide=13+ft, or when advised. You are currently NOT under a mandatory evacuation."

The issues of scalability, compatibility, and interoperability are central to the design of this architecture. When possible, standardized components were used in order to provide flexible solutions that were not restricted to a single vendor. The asynchronous messaging components utilize the Simple Mail Transfer Protocol (SMTP), Internet Message Access Protocol (IMAP), and the Multipurpose Internet Mail Extensions (MIME) standards that are used in the daily exchange of millions of emails around the world. These open standards have been implemented using a variety of open source and proprietary email servers and clients, and are scalable in size and load from small businesses with a few dozen staff members to international corporations with thousands of employees. The Internet, which utilizes the TCP/IP and HTTP protocols, is used as a transport network, which carries similar messages to thousands of computers around the world. When creating software for the mobile phone, the Java 2 Microedition (J2ME) platform, which is the currently the most popular software platform for mobile phones due to its transportability to different phone manufacturers and carriers, along with various APIs was utilized. This includes the Mobile Media API, Location API, and Wireless Messaging API. The use of these APIs assures that the software created for this architecture will work with any mobile phone or carrier that supports the standard, instead of being limited to a single vendor. The database used to store information, SQL Server 2000, supports standard SQL database queries that can be executed by any client. XML, a general purpose data formatting language, is used when generating data to be displayed on the map on the web page. Each of these components is also designed in a modular fashion in order to allow the creation of application-specific functions without needing to redesign the entire system.

This architecture supports two-way multimedia communication that can be based on personal profiles, including the individual's real-time location. This feature allows unique services that have not been previously possible, including the automatic submission of pictures and video captured by mobile phones that are automatically plotted on a webpage map for anyone with a web browser to see. Additionally, the webpage user can then send information back to the mobile phones based on the location from where the picture or video originated. This mass messaging has the potential to be specifically targeted at certain geographic areas, or the person can use Voice-Over-IP calling service to initiate a phone call by clicking on up to four mobile phone numbers on the map. The common platform of the web browser can be used to share real-time information between groups in distributed locations, as anyone with a PC or laptop with an internet connection can log into the page. Massive information gathering and dissemination tasks can be easily accomplished through this architecture, as demonstrated by the system applications. This information is also sent using the Internet and mobile phone data channels, which are not as susceptible to overcrowding as traditional phone line networks. Therefore, the communication ability of this system is not as likely to be affected by disasters of national significance and frees voice lines in emergencies for first responders and other officials. In situations of mass residential power failures, as is often the situation in the aftermath of hurricanes, mobile phones can be powered by hand or car chargers. In such a situation much of the public may not have access to television or even radio, but could receive updates via a mobile phone.

TABLE 1

| Element | Description |
|---|---|
| 10 | Client side module. |
| 10a | Cell Phone User |
| 100 | User interface, including messages and prompts. |
| 101 | Mail Handler |
| 102 | M.T., SMS, MMS |
| 103 | 2-Way wireless data communication (i.e. IDEN, 1xRTT, GPRS, EVDO) |
| 104 | User input and application output. |
| 105 | J2ME main application. |
| 106 | J2ME Wireless Messaging API. |
| 107 | M.O.MMS with packaged GPS data. |
| 108 | J2ME GPS data processing agent. |
| 109 | J2ME location API. |
| 110 | GPS fix is requested and obtained. |
| 111 | GPS hardware. |
| 112 | GPS signals. |
| 113 | TCP/IP or HTTP |
| 114 | J2ME mobile media API. |
| 115 | Image capture is requested & obtained. |
| 116 | Image capture hardware. |

TABLE 2

| Element | Description |
|---|---|
| 20 | Carrier network module |
| 30 | Internet module. |
| 103 | 2-Way wireless data communication (i.e. IDEN, 1xRTT, GPRS, EVDO) |
| 120 | M.T., SMS, MMS |
| 121 | Public messaging gateway. |
| 122 | M.O., MMS with packaged GPS data. |
| 123 | TCP/IP or HTTP. |
| 124 | LBS database. |
| 125 | LBS API server. |
| 126 | Cell phone GPS locations. |

TABLE 3

| Element | Description |
|---|---|
| 20 | Carrier network module |
| 20a | User and interface. |
| 30 | Internet module. |
| 40 | Server module. |
| 130 | M.T. Email with attachments. |
| 131 | Mail server |
| 132 | SMTP: Scheduled and triggered M.T. email. |
| 133 | M.O. Email with packaged GPS data. |
| 134 | Javamail API retrieves M.O. Mail with packaged GPS data. |
| 135 | SMTP: User initiated M.T. email. |
| 136 | TCP/IP or HTTP |
| 137 | Map server |
| 138 | VOIP server |
| 139 | Map data |
| 140 | VOIP data |
| 141 | Web pages and data |

TABLE 4

| Element | Description |
|---|---|
| 30 | Internet module. |
| 40 | Server module. |
| 150 | Internal triggered and scheduled processes as T-SQL stored procedures. |
| 151 | M.O./M.T. messages |
| 152 | User and device profiles |
| 153 | Specialty data stores |
| 154 | Parses and stores M.O. Messages and GPS data |
| 155 | GIS database |
| 156 | Mail client |
| 157 | Specialty algorithms and agents |
| 158 | Data processing agents (VB.net) |
| 1589 | Data processing agents (Java) |
| 160 | Communication agents (ASP.net) |
| 161 | Communication agents (Java servlets) |
| 162 | IIS and apache web servers |
| 163 | Specialty algorithms (Java) |

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

What is claimed is:

1. A computer system for processing messages indicative of an emergency received from a mobile device, comprising:
a processor; and
a tangible memory storage including software instructions that cause the computer system to perform:
receiving a transmission, containing the mobile device's position information, and at least one emergency identifier, from the mobile device, displaying a geographic map, having user-selectable modes, on a graphical user interface, wherein the user-selectable modes include a map mode, a satellite mode, and a hybrid mode,
displaying a marker on the geographic map indicating the mobile device's position information,
rendering the received emergency identifier as a thumbnail,
displaying the thumbnail on the graphical user interface in correlation with the mobile device's position information, responsive to selection of the marker,
receiving a user selection of an area on the geographic map, and
contacting the mobile device if the mobile device is located within the selected area,
wherein the computer processes messages indicative of an emergency received from the mobile device.

2. The computer system of claim 1, wherein the tangible memory storage further includes software instructions that cause the computer system to perform:
displaying a plurality of markers indicating a plurality of mobile devices' position information on the geographic map.

3. The computer system of claim 2, wherein the tangible memory storage further includes software instructions that cause the computer system to perform:

receiving a user selection of an area on the geographic map, and contacting each of the plurality of mobile devices located within the selected area.

4. The computer system of claim 1, wherein the at least one emergency identifier is selected-from the group consisting of text, audio, video, and picture.

5. The computer system of claim 1, wherein the tangible memory storage further includes software instructions that cause the computer system to perform:

rendering at least a first contact button on the graphical user interface in correlation with the marker, and contacting the mobile device, responsive to selection of the contact button.

6. The computer system of claim 1, wherein the mobile device is contacted with a phone call.

7. The computer system of claim 1, wherein the mobile device is contacted with a text message.

8. The computer system of claim 1, wherein the mobile device is contacted with an email message.

9. The computer system of claim 1, wherein the received transmission is an email message.

10. The computer system of claim 1, wherein the tangible memory storage further includes software instructions that cause the computer system to perform:

parsing the position information from the at least one emergency identifier, and storing the parsed position information and the at least one emergency identifier.

11. A non-transitory, tangible computer readable storage medium bearing software instructions for enabling a computer to process messages indicative of an emergency received from a mobile device, the software instructions for predetermined operations including:

receiving a transmission, containing the mobile device's position information, and at least one emergency identifier, from the mobile device, displaying a geographic map, having user-selectable modes, on a graphical user interface, wherein the user-selectable modes include a map mode, a satellite mode, and a hybrid mode, displaying a marker on the geographic map indicating the mobile device's position information, rendering the received emergency identifier as a thumbnail, displaying the thumbnail on the graphical user interface in correlation with the mobile device's position information, responsive to selection of the marker, receiving a user selection of an area on the geographic map, and contacting the mobile device if the mobile device is located within the selected area, wherein the computer processes messages indicative of an emergency received from the mobile device.

12. The computer readable storage medium of claim 11, wherein the predetermined operations further comprise:

displaying a plurality of markers indicating a plurality of mobile devices' position information on the geographic map.

13. The computer readable storage medium of claim 12, wherein the predetermined operations further comprise:

receiving a user selection an area on the geographic map, and contacting each of the plurality of mobile devices located within the selected area.

14. The computer readable storage medium of claim 11, wherein the at least one emergency identifier is selected-from the group consisting of text, audio, video, and picture.

15. The computer readable storage medium of claim 11, wherein the predetermined operations further comprise:

rendering at least a first contact button on the graphical user interface in correlation with the marker, and contacting the mobile device, responsive to selection of the contact button.

16. The computer readable storage medium of claim 11, wherein the mobile device is contacted with a phone call.

17. The computer readable storage medium of claim 11, wherein the mobile device is contacted with a text message.

18. The computer readable storage medium of claim 11, wherein the mobile device is contacted with an email message.

19. The computer readable storage medium of claim 11, wherein the received transmission is an email message.

20. The computer readable storage medium of claim 11, wherein the predetermined operations further comprise:

parsing the position information from the at least one emergency identifier, and storing the parsed position information and the at least one emergency identifier.

* * * * *